(12) United States Patent     (10) Patent No.:    US 6,547,211 B2
Roman                          (45) Date of Patent:    Apr. 15, 2003

(54) SOLENOID VALVE WITH PROGRAMMABLE ELECTRONIC CONTROL DEVICE, PARTICULARLY FOR WATERING SYSTEMS

(75) Inventor: Gianfranco Roman, Pasiano (IT)

(73) Assignee: Claber S.p.A. (IT)

( * ) Notice: Subject to any disclaimer, the term of this patent is extended or adjusted under 35 U.S.C. 154(b) by 0 days.

(21) Appl. No.: 09/769,029

(22) Filed: Jan. 24, 2001

(65) Prior Publication Data

US 2001/0009270 A1 Jul. 26, 2001

(30) Foreign Application Priority Data

Jan. 24, 2000 (IT) ........................................ MI000033 U

(51) Int. Cl.[7] .......................................... F16K 31/126
(52) U.S. Cl. .............................. 251/30.01; 251/129.15
(58) Field of Search ....................... 251/30.01, 30.02, 251/30.03, 30.04, 129.15

(56) References Cited

U.S. PATENT DOCUMENTS

| 3,821,967 | A |   | 7/1974  | Sturman et al.   |           |
|-----------|---|---|---------|------------------|-----------|
| 4,811,221 | A | * | 3/1989  | Sturman et al.   | 251/30.01 |
| 5,125,621 | A | * | 6/1992  | Parsons et al.   | 251/30.03 |
| 5,133,382 | A | * | 7/1992  | Nielsen          | 251/30.02 |
| 5,169,118 | A | * | 12/1992 | Whiteside        | 251/30.03 |
| 5,205,531 | A | * | 4/1993  | Kolchinsky       | 251/129.15|
| 5,232,196 | A | * | 8/1993  | Hutchings et al. | 251/129.15|
| 5,311,162 | A | * | 5/1994  | Sjoquist et al.  | 251/129.15|
| 5,520,447 | A |   | 5/1996  | Burgdorf et al.  |           |
| 5,845,672 | A | * | 12/1998 | Reuter et al.    | 251/129.15|
| 5,927,605 | A | * | 7/1999  | Odajima et al.   | 251/30.02 |
| 6,000,674 | A | * | 12/1999 | Cheng            | 251/30.02 |
| 6,016,836 | A | * | 1/2000  | Brunkhardt       | 251/30.02 |

FOREIGN PATENT DOCUMENTS

| EP | 0 687 817 A1 | 12/1995 |
| EP | 0 745 322 A1 | 12/1996 |
| EP | 0 888 709 A1 | 1/1999  |
| EP | 1 043 528 A2 | 10/2000 |

* cited by examiner

Primary Examiner—Henry C. Yuen
Assistant Examiner—John Bastianelli
(74) Attorney, Agent, or Firm—Akerman Senterfitt

(57) ABSTRACT

A solenoid valve is described comprising a hydraulic valve a valve body in which said hydraulic valve is housed and a control solenoid for said valve. The solenoid valve has in addition a programmable electronic control device that is housed together with said solenoid in a removable way inside an openable watertight container that is tightly fastened to said valve body.

3 Claims, 2 Drawing Sheets

SOLENOID VALVE WITH PROGRAMMABLE ELECTRONIC CONTROL DEVICE, PARTICULARLY FOR WATERING SYSTEMS

BACKGROUND OF THE INVENTION

1. Field of the Invention

The present invention concerns a solenoid valve with programmable electronic control device, particularly for watering systems.

2. Description of the Related Art

There are also known solenoid valves of the aforesaid type in which the control solenoid is made up of two parts, as described in U.S. Pat. No. 6,352,238, where a first part of the solenoid includes a piston for the operation of a hydraulic valve and a magnet for attraction of the same piston and is screwable on the external body of the solenoid valve and a second part includes an electric solenoid for the excitation of the magnet that is provided with "faston®" type electric connectors and which is fastened to the first part in a removable way by means of a removable and re-insertable locking element.

For some uses it can be desirable to equip the single solenoid valve with its own electronic control device of programmable type, that makes the same solenoid valve independent from the general program of the watering system or that even prevents the need of having a control unit for the system.

However a solenoid valve provided with an independent control device inevitably becomes object of thefts and vandalism acts, particularly during the periods of absence of the user.

In addition the electronic control device inset in the solenoid valve can deteriorate for infiltration of humidity or rain or other atmospheric events, in particular during the autumn and winter periods, when besides the watering is no longer required.

Finally the programming operation of the electronic control device inset in the solenoid valve requires the intervention of the user or the programmer directly on the site where it is used, often inconvenient and difficultly accessible.

SUMMARY OF THE INVENTION

All that considered, object of the present invention is to realise a solenoid valve with autonomous programmable electronic control device that is free of the aforementioned disadvantages.

According to the present invention, such object is reached by means of a solenoid valve comprising a hydraulic valve, a valve body in which said hydraulic valve is housed and a control solenoid for said valve, characterised in that it comprises in addition a programmable electronic control device that is housed together with said solenoid in a removable way inside a watertight openable container that is sealingly fastened to said valve body.

Owing to the present invention a solenoid valve with its own electronic control device is thus realised that, when in use, preserves the same device as regards infiltration of humidity or rain or others atmospheric events and at the same time it allows, when desired, to extract the control device so as to have it protected from thefts and vandalism acts and to allow its convenient programming at home or in a laboratory.

Preferably the solenoid is of the type that is made up of a first part including a piston for the operation of the hydraulic valve and an attraction magnet for said piston and of a second part fastened to the first one in a removable way and including an electric solenoid for the excitation of the magnet.

The electric solenoid too, that it is the most expensive part and subject to failure of the solenoid, can therefore take advantage of the favourable effects of the watertight containment and removability as the ones previously described for the electronic control device.

BRIEF DESCRIPTION OF THE DRAWINGS

The characteristics and the advantages of the present invention will become evident from the following detailed description of an embodiment thereof, that is illustrated as a non-limiting example in the enclosed drawings, in which.

DETAILED DESCRIPTION

Figure 1:
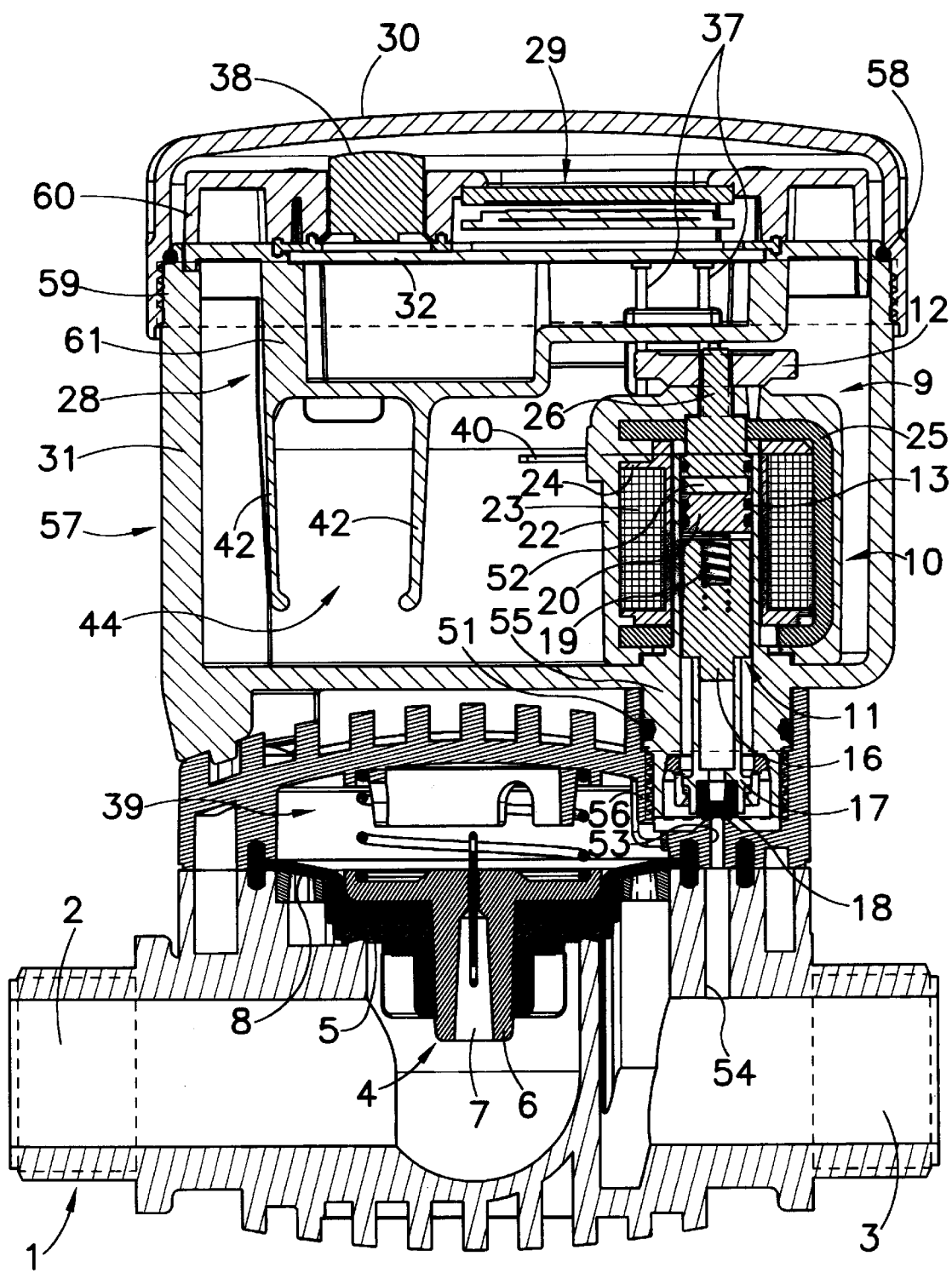
FIG. 1 shows in axial section a solenoid valve according to the present invention.

In FIG. 1 a solenoid valve for watering system is shown, that in a way known per se comprises a valve body 1, inside of which two duct sections 2 and 3 are found, respectively for the input and output of water, that are selectively separate or put into communication by a membrane valve 4 by means of a transversal hole 5 belonging to the section 2.

The valve 4 is made up of a rigid body 6 along whose axis a passage 7 is provided. Said rigid body transversely bears the central part of a rubber membrane 8 that is fixedly mounted to the rigid casing 1 and acts as a tightening element of the valve 4.

The valve 4 is normally kept (by elastic means not shown) in closing position of the hydraulic connection between the duct section 2 and an intermediate chamber 39 that is in turn normally closed with respect to the duct section 3 owing to a sealing nog 18 that is kept against the mouth of a passage 53 that is made in the valve body 1 beside the chamber 39 and communicating with a transversal passage 54 of the duct section 3.

To the opening of the valve 4 provides a bistable solenoid 9, supplied with direct current, that it is made up of two parts 10 and 11 normally held together by an unscrewable threaded ring nut 12.

The internal part 11 of the solenoid 9 comprises a tubular body 13 that ends with an externally threaded axial appendix 55, that is screwed in a corresponding internally threaded housing 56 of the valve body 1, in which the passage 53 ends, in order to realise the removable mechanical coupling between the solenoid and the remaining part of the solenoid valve. A packing 51 assures the tightness between the appendix 55 and the housing 56.

In the tubular body 13 a metallic piston 16 is housed, in an axially sliding way, that has at one end a supporting tubular body 17 for the sealing nog 18 and that is set into action at the other end by a spring 19 that reacts against an end of a permanent magnet 20 that is provided with a high magnetism magnetic disc 52 and at the other end has a threaded tang 26 onto which the ring nut 12 is screwed.

The external part 10 of the solenoid 9 comprises in turn a plastic envelop 22 that encloses an electric solenoid 23 with relative spool 24 and "faston" type electric connectors 40 and a cylindrical metallic support 25 open on one side, that completes the magnetic circuit comprising the magnet 20 and the piston 16.

The external part 10 is mounted onto the internal part 11 in an axially sliding way and it is held in position by the ring nut 12 that is screwed onto the tang 26. External part 10 therefore turns out to be removable as regards the internal part 11.

The solenoid 9 is housed inside a watertight container 57 that has a base part 31 extending sideways and upward from the axial appendix 55 of the same solenoid and a cover 30 that is screwed onto the threaded top 59 of the base part 31 with interposition of a seal packing 58.

Inside the watertight container 57, in an extractable way, a programmable electronic control device 28 is also housed that is made up of two casing parts 60 and 61 that are fastened to each other, of an internal circuit card 32 with one pair of pins 37 for its connection (through wires not shown) to the connectors 40 of the solenoid 9, of three keys 38 extending outside of the casing 60, 61 and of a liquid crystals display 29 that is observable from outside of said casing.

From the side of the bottom casing 61 a pair of flexible arms 42 extend towards the bottom that define as a whole a housing space 44 for a battery for the supply of the electronic device 28.

Figure 2:
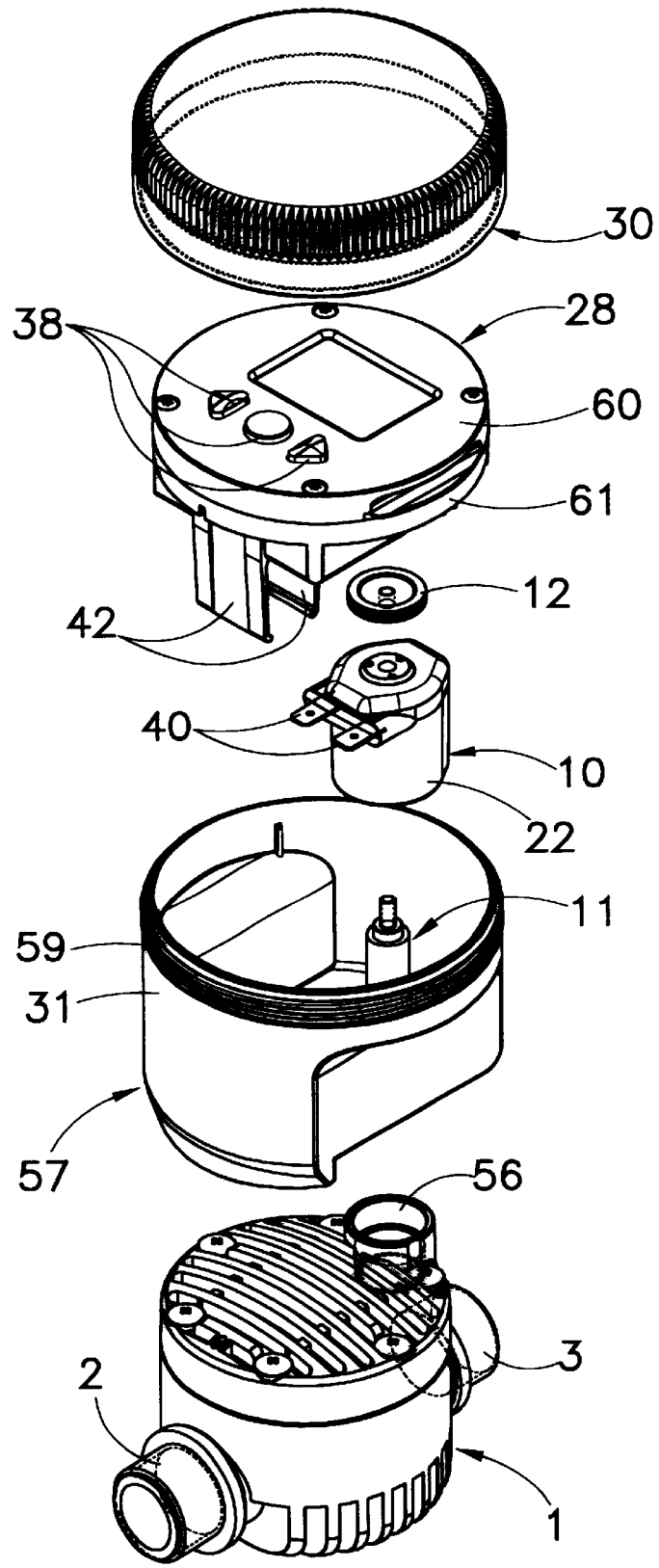
FIG. 2 shows a magnified representation of the solenoid valve in FIG. 1.

The single components of the unit in FIG. 1 are shown in exploded perspective in FIG. 2.

The way in which the solenoid valve illustrated in the drawings works is the same as the valve of U.S. Pat. No. 6,352,238, therefore the description will not be repeated, and exception being made for the fact that in this case the commutations of the solenoid 9 are controlled by the internal electronic control device 28 instead of by a remote central unit.

It is instead important to notice that the insertion of the control device 28 and of the solenoid 9 inside the watertight container 57 allows the protection of both the electronic control device and the solenoid from infiltration of humidity or rain or other harmful atmospheric events.

The possibility to open the container and to extract the electronic control device 28 allows on one hand to store the same device in a safe place as regards thefts and vandalism acts during the periods in which the solenoid valve is not used, in particular during autumn and winter periods. In addition the eventual new programming of the electronic control device at home or in laboratory instead of onsite is made possible.

The external part 10 of the solenoid 9 also can be similarly removed, both for its protection from thefts and vandalism acts and for purposes of maintenance and substitution in case of breakdown.

What is claimed is:

1. A solenoid valve comprising:

a valve body;

a movable valve member housed in said valve body;

a control solenoid for said valve member;

a removable programmable electronic control device; and a watertight container that houses said solenoid and said programmable electronic control device and which is sealable to said valve body;

wherein said container comprises a base part mounted onto said valve body and a cover screwable onto said base part for access to said programmable electronic control device and the solenoid and, wherein said control solenoid comprises: an internal part; and an external part removably fastened to the internal part by a removable and reinsertable locking element, wherein the internal part includes a piston for the operation of said valve member and a magnet for the attraction of the piston and is screwable onto said valve body, and wherein the external part includes an electric solenoid for the excitation of said magnet, and is provided with quick fastening electric connectors.

2. The solenoid valve according to claim 1, wherein said electronic control device comprises:

a casing that encloses electric circuitry;

at least one operating key extending outside of said casing; and a display observable from outside of the casing.

3. The solenoid valve according to claim 1, wherein said control solenoid is removable from said watertight container.

\* \* \* \* \*